March 12, 1957 A. E. CHELGREN 2,785,309

SWEEP GENERATOR

Filed April 29, 1953 2 Sheets-Sheet 1

ARVID E. CHELGREN
*INVENTOR.*

BY Francis W. Crotty

HIS ATTORNEY.

March 12, 1957 A. E. CHELGREN 2,785,309

SWEEP GENERATOR

Filed April 29, 1953 2 Sheets-Sheet 2

ARVID E. CHELGREN
*INVENTOR.*

BY Francis W. Crotty

HIS ATTORNEY.

United States Patent Office 2,785,309
Patented Mar. 12, 1957

2,785,309

SWEEP GENERATOR

Arvid E. Chelgren, Elmhurst, Ill., assignor to Zenith Radio Corporation, a corporation of Illinois Application April 29, 1953, Serial No. 351,910
5 Claims. (Cl. 250—36)

This invention relates to a new and improved sweep generator; more specifically, it concerns a sweep generator operable over a wide range of frequencies within the ultra-high-frequency band. Although the invention may be advantageously employed for work within any portion of the ultra-high-frequency band, it is particularly valuable in the testing of television equipment intended for use in the range of frequencies from 470 to 890 megacycles and will be described in that connection.

The Federal Communications Commission has recently released plans for the utilization of some 70 television frequency channels all lying within the UHF band of frequencies from 470 to 890 megacycles; the Commission has issued and is continuing to issue authorizations and construction permits for television transmitters to operate at these frequencies. Consequently, it has become necessary for manufacturers of television receivers to develop and manufacture equipment capable of reproducing UHF telecasts. However, most of the circuit components suitable for use at these frequencies are of relatively recent origin and it has been necessary to adopt stringent quality-control methods in order to meet requirements with respect to performance in UHF receivers.

One of the most difficult problems presented in testing UHF circuit components comprises the necessity for test equipment capable of operating across the entire UHF band of frequencies; equipment of this type is highly desirable in that it avoids unnecessary and uneconomical duplication of test facilities. Furthermore, in order to be economically feasible, test equipment used for quality control purposes in the manufacture of receivers must be relatively inexpensive so that multiple testing stations may be installed without prohibitive expense; in addition, the equipment should be easily and accurately adjustable to permit operation by relatively unskilled personnel. One of the principal problems encountered in developing equipment of this type has been the difficulty in obtaining adequate power output from signal sources comprising standardized and inexpensive components; in addition, construction of a test signal generator which presents a balanced source of power has been found to be extremely difficult.

It is an object of this invention to provide a new and improved sweep generator of adequate power output for testing purposes and operable over a wide range of frequencies within the ultra-high frequency band.

It is a corollary object of this invention to provide an improved sweep generator which functions as a balanced signal source and in which the effective source impedance may be easily varied.

It is a further object of the invention to provide a new and improved sweep generator in which the output signal amplitude is substantially constant throughout a wide range of frequencies and in which the output signal level may be readily adjusted.

It is another object of the invention to provide a new and improved sweep generator utilizing components which are relatively simple in form and easily and economically manufactured.

In accordance with the present invention, a sweep generator comprises an electrically conductive shield structure defining a substantially totally enclosed field space. An oscillator is mounted within the shield structure for establishing a radio-frequency electromagnetic field within the enclosed space. This oscillator includes two reactance elements of opposite sign, at least one of which is variable for determining the maximum frequency range of the oscillator. Means are coupled to one of the reactance elements for cyclically varying the operating frequency of the oscillator at a preselected sweep frequency over its maximum range of oscillating frequencies. The generator further comprises a transmission-line section, having input terminals and output terminals and a predetermined characteristic impedance, and a first resistive element having an impedance substantially equal to the characteristic impedance of the transmission-line section is connected between the input terminals and extends into the enclosed field space at a predetermined location. A second resistive element having an impedance substantially equal to the characteristic impedance of the transmission-line section is connected between the output terminals. An amplitude-control circuit is coupled to the transmission-line section and to the oscillator for maintaining the output of the oscillator at a substantially constant amplitude throughout its maximum range. In addition, an output probe comprises a second transmission-line section and has input terminals and output terminals. This transmission-line section also has a characteristic impedance substantially equal to that of the first transmission-line section. A third resistive element having an impedance substantially equal to the characteristic impedance of the second transmission-line section is connected between the input terminals of this section and extends into the enclosed field space at a location displaced from the location of the first transmission-line section. Means are coupled to the output terminals for coupling the oscillator to an external load.

The features of the invention which are believed to be novel are set forth with particularily in the appended claims. The organization and manner of operation of the invention itself, together with further objects and advantages thereof, may best be understood by reference to the following description taken in conjunction with the accompanying drawings, in which:

Figure 1:
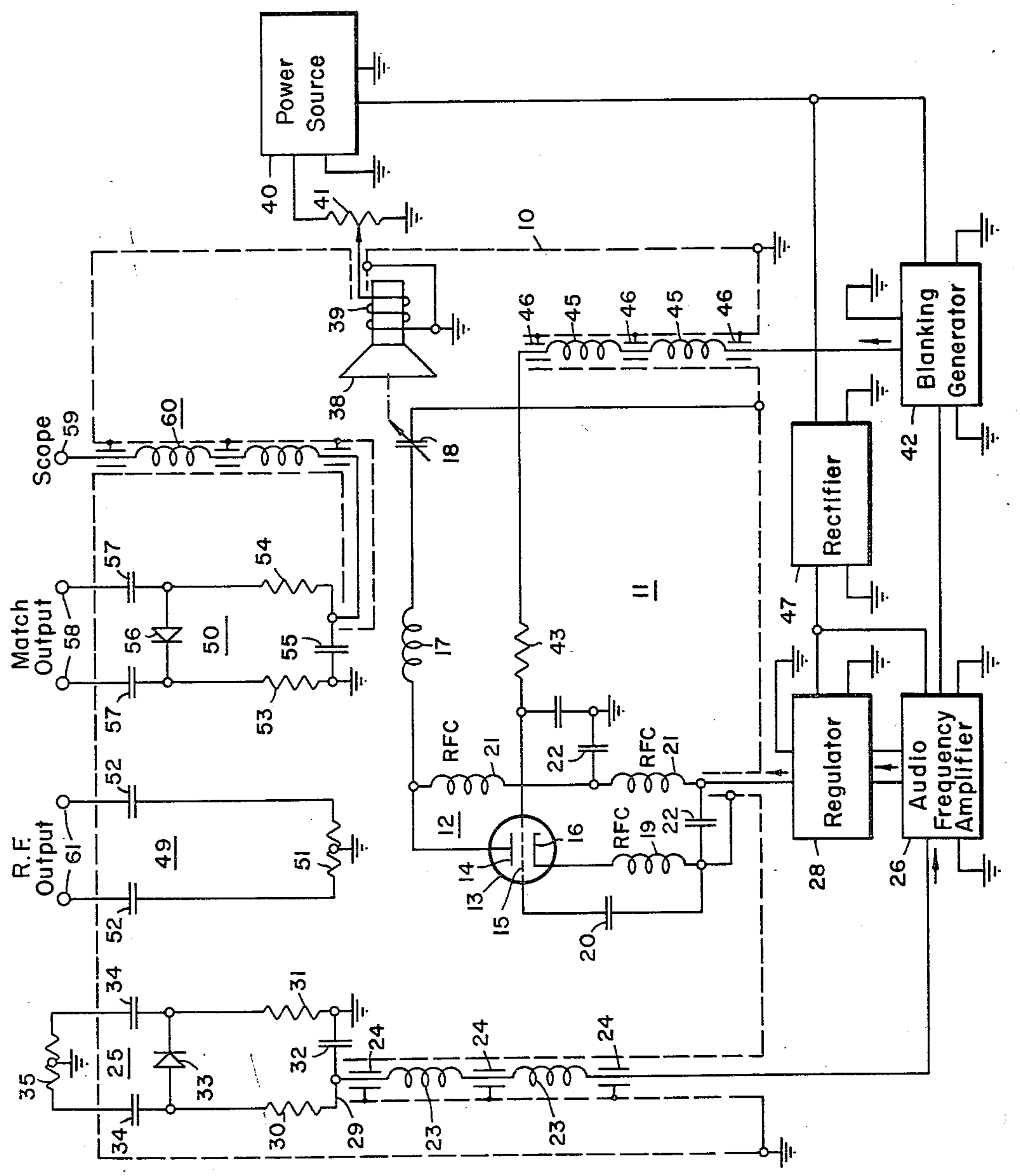
Figure 1 is a schematic circuit diagram of a sweep generator constructed in accordance with the invention.

The sweep generator illustrated in Figure 1 comprises an electrically conductive shield structure 10 which defines a substantially totally enclosed field space 11; the shield structure is coupled to a plane of reference potential (ground). An oscillator 12 is mounted within field space 11 and includes an electron-discharge device 13 comprising an anode 14, a control electrode 15, and a cathode 16. Oscillator 12 further includes a principal frequency-determining impedance element, comprising an inductor 17 and a condenser 18, coupled in series between anode 14 and the grounded shield 10. Cathode 16 is also coupled to ground through a radio-frequency choke 19, whereas control electrode 15 is coupled to ground through a capacitor 20. The operating potential for device 13 is supplied by means of a connection to anode 14 through a filter system comprising a pair of chokes 21 and a pair of capacitors 22. The oscillator circuit, except for shield structure 10, is disclosed and specifically claimed in a copending application of John F. Bell, Serial No. 164,784, filed May 27, 1950, now Patent No. 2,663,799, issued December 22, 1953, and assigned to the same assignee as the present invention.

The sweep generator of Figure 1 further includes an amplitude-control circuit for oscillator 12 comprising a monitor probe 25 which is coupled to an audio-frequency amplifier 26 through a filter circuit comprising a pair of inductors 23 and three coaxial capacitors 24. Amplifier 26 is connected to a regulator 28 which is coupled to anode 14 through the filter circuit comprising impedance elements 21—22. Monitor probe 25 comprises a transmission-line section of a predetermined characteristic impedance terminated at one end 29 by a pair of resistors 30 and 31 which together have an impedance approximately equal to the characteristic impedance of the line. Resistors 30 and 31 are coupled to each other through a blocking capacitor 32, the junction between capacitor 32 and resistor 31 being connected to ground potential. A detector or rectifier 33 is included in probe 25 and is coupled across the transmission-line section. A pair of capacitors 34 are interposed in the probe circuit between rectifier 33 and the end of the transmission-line opposite end 29, which, as with end 29, is terminated in its characteristic impedance by a resistor 35; the electrical center of resistor 35 is connected to ground.

Figure 2:
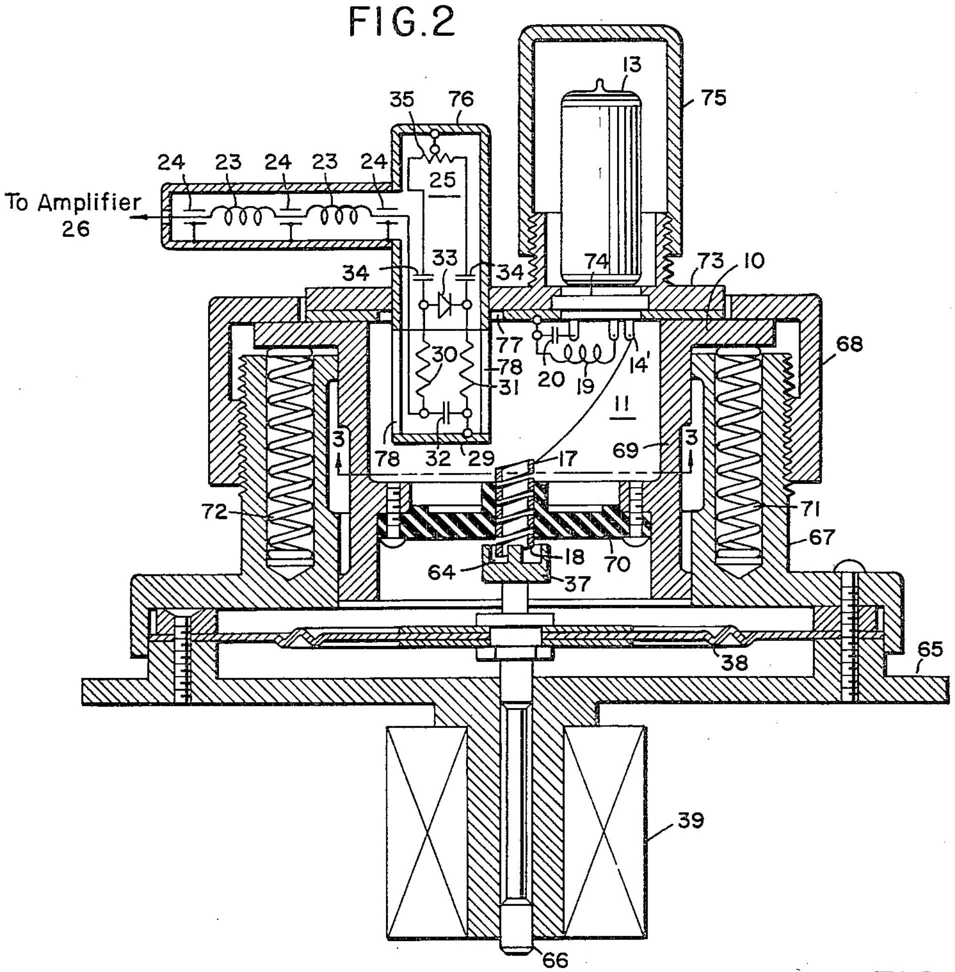
Figure 2 is a sectional view, partially schematic, of a preferred embodiment of a portion of the apparatus of Figure 1.

Variable capacitor 18 includes a tuning element 37, which is shown more completely in Figure 2. As schematically illustrated in Figure 1, tuning element 37 is mechanically linked to a diaphragm 38; diaphragm 38 is in turn coupled to a magnetic driving "motor" 39. Diaphragm 38 and driving element 39 are basically similar in structure and operation to an ordinary audio speaker. Motor 39 is electrically connected to a power source 40 through a variable resistor 41; power source 40 may be a standard 60-cycle alternating-current supply source and variable resistor 41 may comprise any suitable rheostat or other power-adjustment arrangement.

The sweep generator of Figure 1 also includes a blanking generator 42 which may be energized by means of a suitable connection to power source 40. Blanking generator 42 is coupled to amplifier 26 and to control electrode 15 of oscillator 12, the oscillator connection being made through a damping resistor 43 and a filter comprising a pair of inductors 44 and 45 and three coaxial capacitors 46. Amplifier 26 and regulator 28 are coupled to power source 40 through a rectifier 47 which serves as a source of operating potential for those circuits; if preferred, separate power sources may be used for generator 42, regulator 28, and amplifier 26.

A pair of output devices, probes 49 and 50, are included in the sweep generator to permit coupling oscillator 12 to external loads. Probe 49 comprises a transmission-line section having a characteristic impedance substantially identical with that of the transmission-line section of monitor probe 25. The transmission-line section of probe 49 is terminated in its characteristic impedance by a resistor 51; the electrical center of resistor 51 is coupled to ground. The end of device 49 terminated by resistor 51 extends within field space 11, while the opposite end comprises a pair of terminals 61 for connection to an external load. A pair of blocking condensers 52 are included in the probe and are essentially identical, both physically and electrically, with capacitors 34 of monitor probe 25. Output device 50 likewise includes a transmission-line section terminated in a pair of resistors 53, 54 and a capacitor 55 coupled therebetween; a detector 56 is connected across the transmission-line section and a pair of capacitors 57 are interposed in the line between detector 56 and the output terminals 58. An additional output terminal 59 is coupled to probe 50 at the junction of resistor 54 and capacitor 55 through a filter circuit 60. Probe 50 is in all respects substantially identical with monitor probe 25, except that no specific termination is connected across its output terminals 58. If complete standardization is desired, terminals 58 of probe 50 may be made identical with output terminals 61 of probe 49. It should be noted that the particular type of filter circuits used in the output connections of probes 25 and 50 are not critical; filters 23—24 and 60, as well as filter 45—46, may be replaced by any suitable filter circuit, since these devices are included only to prevent excessive radiation and possible adverse effects from stray fields.

Because the operation of oscillator 12 is explicitly and succinctly described in the above-mentioned copending application of John F. Bell only a brief outline of its operation is deemed necessary here. Operating potential for the oscillator is supplied from rectifier 47 through regulator 28, the regulator being so constructed that a constant potential difference between anode 14 and cathode 16 of tube 13 is maintained in the absence of any signal from the amplitude-control circuit interconnecting oscillator 12 and regulator 28. The resonant frequency of the oscillator is determined primarily by the principal impedance element comprising coil 17 and capacitor 18; whereas variations in the oscillator resonant frequency are obtained by movement of tuning element 37.

Diaphragm 38 is vibrated or mechanically oscillated at a fixed frequency under the influence of driving motor 39 to vary the impedance of capacitor 18. Accordingly, oscillator 12 cyclically sweeps through a range of frequencies determined by the effective changes in capacitance 18; resistor 41 may be adjusted to effectively regulate the amplitude of vibration of diaphragm 38 and therefore to regulate the oscillator so that it sweeps through all or any fractional part of its total range of frequencies. In addition, in the preferred embodiment, means are provided to adjust the initial position of tuning element 37 with respect to capacitor 18 to determine the position of the range of frequencies actually swept by oscillator 12 within its total range for any given operating condition; this arrangement is more completely described in connection with Figure 2.

With the oscillator in operation, an electrical field is established within space 11. The transmission-line section comprising probe 49 extends into this field, which induces in the probe a signal voltage having a frequency equal to the instantaneous operating frequency of oscillator 12. Since the transmission-line section is terminated in its characteristic impedance and is center-tapped to ground, the probe appears as a balanced source of radio-frequency signals to any external load connected across terminals 61.

Figure 1A:
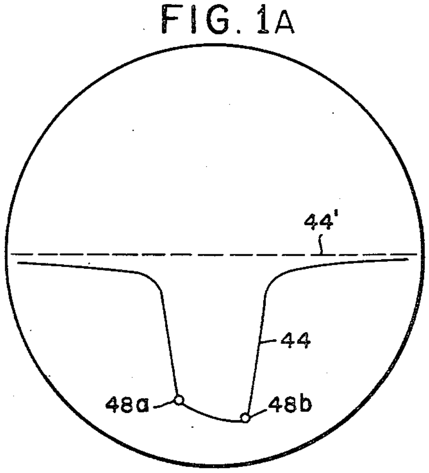
Figure 1A is an explanatory diagram illustrating one possible use of the sweep generator of Figure 1.

The balanced radio-frequency signal appearing at terminals 61 is cyclically varied in frequency in accordance with the changes in operating frequency of oscillator 12 and may be used in a wide variety of test procedures well known in the art. One test in which an output signal of this type has been advantageously employed comprises testing the tuned circuits used for preselection and other purposes in television receivers to determine their effective band-pass characteristics. Because the additional test equipment utilized in this procedure and others described hereinafter is a familiar part of the electronic art, it has not been illustrated. In determining the band-pass characteristic of a preselector, which usually comprises a tuned circuit and a balanced, inductively coupled energizing circuit, the signal appearing at terminals 61 is applied directly to the energizing circuit, translated through the tuned circuit or circuits, rectified, and coupled to the vertical amplitude-control circuit of a suitable oscilloscope. The horizontal sweep rate of the oscilloscope is synchronized with the periodic variations in the operating frequency of oscillator 12 by connecting the oscilloscope sweep circuit to power source 40. The resulting visual image on the oscilloscope is illustrated in Figure 1A, in which the band-pass characteristic of a preselector under test is illustrated by curve 44. At the same time, the output of probe 49 is also supplied to a very sharply tuned resonant circuit, the output of that resonant circuit being rectified and coupled to the intensity control of the oscilloscope. If the proper polarities for the rectified signals are maintained, a sharp increase in the intensity of the oscilloscope presentation occurs whenever oscillator 12 achieves a predetermined reference frequency, which may be chosen to be equal to any point on the desired band-pass characteristic. More than one such intensity connection may be employed so that several bright "spots" or "markers" are formed at predetermined points on curve 44 corresponding to the selected reference frequencies, as indicated by markers 48a and 48b in Figure 1A. This testing technique is generally familiar in the art; however, it has heretofore been difficult to carry out due to the lack of a suitable balanced signal source which may be coupled to the usual preselector circuits intended for use with a balanced antenna.

Output probe 50 is coupled to oscillator 12 through the electrical field developed within space 11 in exactly the same manner as probe 49. Accordingly, the signal across terminals 58 is essentially the same as that appearing at terminals 61. Probe 50 may also be employed to develop markers indicative of a particular frequency within the band swept by oscillator 12 as indicated above in the description of the operation of probe 49; another method of producing markers of this type comprises differentiating the rectified output available at terminal 59 and applying this signal directly to the vertical input of an oscilloscope. This provides a different type of marker, which appears as a differentiated pulse on the scope. Either of the marker techniques described provides a constant marker whether or not any other test pattern is displayed on the scope.

If a transmission-line of known characteristics is connected to terminals 58, any mistermination of the line makes it reflective. A finite time is required for the reflected signal to reach the mistermination and return; accordingly, the reflected signal beats with a signal representative of the output of oscillator 12 at a different period of time and accordingly having a different frequency, the time differential corresponding to twice the delay of the transmission-line. The beat-frequency signal developed is detected by rectifier 56 and may then be used to determine the voltage standing wave ratio of the line or the complex impedance of an unknown termination. The delay characteristics of a line of unknown quality, as well as many other factors, may also be determined through a similar procedure in accordance with techniques well known in the art.

The sweep generator, as thus far described, is operable without further modification; however, for satisfactory results, it is desirable that the amplitude of the signal derived by either probe 49 or probe 50 be constant throughout the band of frequencies swept by oscillator 12. As a practical matter, it is necessary to provide means for obtaining a flat amplitude-frequency characteristic, since it is virtually impossible to construct oscillator 12 to provide an adequate output and still maintain constant amplitude throughout the oscillator operating range. The amplitude-control circuit comprising probe 25, amplifier 26, and regulator 28 are employed for this purpose. As indicated above, probe 25 is constructed to be as nearly identical as possible, both electrically and physically, with output devices 49 and 50. Since the transmission-line section of probe 25 is terminated at each end in its characteristic impedance, it operates as a reflectionless line; accordingly, the output from probe 25 applied to amplifier 26 corresponds to variations in the average output amplitude of oscillator 12 as detected by rectifier 33. Inasmuch as resistor 35 represents a relatively low impedance with respect to the operating impedances of detector 33, it is usually necessary to incorporate capacitors 34 in the line in order to prevent shunting the detector with a low impedance direct current path. Similar capacitors 52 and 57 are incorporated in output probes 49 and 50 respectively to keep these devices substantially identical with monitor probe 25.

The signal derived by monitor probe 25 is applied to amplifier 26; since the variations in oscillator output and field intensity normally occur at a rate equal to a low integral multiple of 60 cycles per second when a 60 cycle source is used to power driving system 38—39, amplifier 26 is constructed as an audio-frequency amplifier. The amplified amplitude-control signal is applied to regulator 28 and is employed therein to control the operating potential of oscillator 12 and thus regulate the oscillator output to maintain a constant amplitude for the signal voltage induced in the transmission-line section of probe 25. Because output devices 49 and 50 are substantially identical with monitor probe 25, the output probes provide a signal having a constant amplitude throughout the range of frequencies over which oscillator 12 operates. Furthermore, since any change in the radio-frequency signal induced in monitor probe 25 is accompanied by a similar change in the signal developed by the output probes, proper adjustment of the amplification factor of circuit 26 and/or regulator 28 makes it possible to derive from the output devices a radio-frequency signal having a minimum variation of amplitude with respect to frequency throughout the entire band swept by oscillator 12.

For testing purpose, it is usually preferable to use an oscilloscope display which is effective for frequency changes of oscillator 12 in only one direction; in other words, the display is varied only during intervals in which the oscillator frequency increases and shows only a base or reference line during intervals in which the oscillator frequency decreases. If preferred, of course, this sequence may be reversed. Blanking generator 42 operates during half-cycle intervals of the alternating current from source 40 in which diaphragm 38 is moved in a preselected direction to develop blanking pulses. The generator may be adjusted to develop this pulse signal to correspond to movements of tuning element 37 which increase or decrease the impedance of capacitor 18. Preferably, the pulses coincide with intervals in which tuning element 37 is moved by driving system 38—39 to decrease the impedance of element 18 and therefore to decrease the resonant frequency of oscillator 12. The pulses are applied to control electrode 15 of tube 13 so that the tube is rendered non-conductive during these intervals and the oscillator is therefore operative only for periods of increasing frequency. Blanking generator 42 is also coupled to amplifier 26, the blanking pulses being translated through the amplifier to regulator 28 to effectively counteract any stray amplitude-control voltages and restore the system to its original operating condition at the beginning of each sweep cycle. On the return sweep, when oscillator 12 is cut off, the oscilloscope displays an unmodulated base line 44′ (Figure 1A).

The physical configuration and construction of a preferred embodiment of the sweep generator of Figure 1 are illustrated in sectional view in Figure 2. As seen therein, coil 17 comprises a helical coil formed from a flat conductive ribbon, whereas capacitor 18 represents the capacitance between one end of coil 17 and tuning element 37. Tuning element 37 may be formed from any suitable conductive material, preferably brass or aluminum, and includes a slot 64 which receives one end of the coil. The portion of coil 17 which may be encompassed by slot 64 of tuning member 37 is preferably limited to approximately 30% of the coil length so that only capacitive tuning results; a tuned circuit of this type is more completely described and is specifically claimed in Patent No. 2,595,764, entitled High Frequency Resonant Circuit, issued to Arvid E. Chelgren on May 6, 1952 and assigned to the same assignee as the present invention. Tuning member 37 is affixed to diaphragm 38 mounted on a frame 65 comprising part of shield 10. Diaphragm 38 may be formed from any suitable material, preferably conductive, which is capable of sustained oscillation at relatively low frequencies; in the preferred embodiment, the operating vibrational frequency of diaphragm 38 is 60 cycles per second. A shaft 66 is affixed to diaphragm 38 and provides a driving linkage between the diaphragm and driving element 39.

An extension 67 of frame 65 encompasses coil 17 and supports a retaining ring 68, ring 68 being threaded to extension 67. Ring 68 engages an inner shield section 69 which is substantially cylindrical in form. An insulating bushing 70 is mounted on inner shield section 69 and supports coil 17. Shield section 69 also engages a pair of springs 71 and 72 which are mounted in suitable recesses in frame extension 67 and maintain shield section 69 in an adjustably fixed position determined by the position of ring 68 with respect to frame extension 67. An enclosure plate 73 is mounted on shield section 69 and, in conjunction with shield section 69, frame 65, extension 67, and diaphragm 38, defines the totally-enclosed field space 11.

A socket 74 is mounted on plate 73 and is employed to support oscillator tube 13; a removable cover 75 encloses the oscillator tube to prevent excessive radiation. A conductive housing 76 is removably mounted in an aperture 77 in plate 73 and serves as an enclosure for the circuit elements of probe 25. A portion of housing 76 extends within field space 11 and includes a cut-away portion 78 so that end 29 of probe 25 is exposed within the field space.

Figure 3:
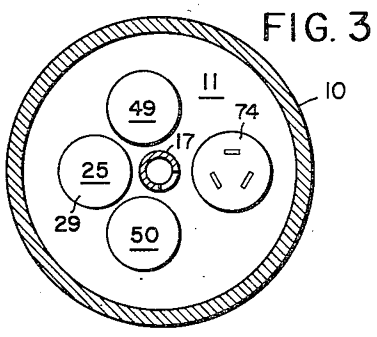
Figure 3 is a sectional view of the apparatus of Figure 2 taken along line 3—3 therein.

The mounting arrangement for the major circuit elements of the sweep generator is more clearly shown in Figure 3. As indicated therein, monitor probe 25 and output probes 49 and 50 extend into field space 11 and are equally radially spaced about the principal frequency-determining element of oscillator 12, represented by coil 17. This view indicates the physical similarity between these elements. The position of tube socket 74 with respect to the center of space 11 is not critical.

Figures 2 and 3 provide an illustration of a preferred type of construction for the sweep generator. The electrical field developed within space 11, generally speaking, is uniform with respect to coil 17. Because probes 25, 49 and 50 are equally radially spaced from coil 17 at points of uniform field intensity and are substantially identical, the variations in amplitude of the radio-frequency signal derived by monitor probe 25 are directly reflected in the output signals of the other two probes and adjustment of the amplitude-control circuit of Figure 1 to provide a uniform induced signal voltage in probe 25 over the full operating range of oscillator 12 effectively provides a uniform output for probes 49 and 50. The threaded connection between retaining ring 68 and frame extension 67 makes it possible to adjust the position of coil 17 with respect to tuning member 37. When it is desired to sweep a reduced portion of the overall operating frequency band, the initial or center point of that portion is established by adjusting the coil-tuning member relationship. The amplitude of the vibrations or mechanical movements of diaphragm 38 may be regulated by adjusting the power supplied to driving element 39 to control the range of frequencies swept. Furthermore, since each of probes 25, 49, and 50 may be moved with respect to plate 73 to penetrate to a greater or lesser extent into space 11, the amplitude of the output signal developed by devices 49 and 50 may be easily adjusted simply by inserting those devices into field space 11 to a greater or lesser extent. Accordingly, probe 49 may be operated as an attentuator of the well known wave guide below cut-off type, and the strength of the signals derived by probes 25 and 50 may be adjusted further to minimize the effects of amplitude variations in the output of sweeping oscillator 12.

Examination of the structure illustrated in Figures 2 and 3 indicates that the sweep generator is constructed from standard components and the shield structure presents no difficult problems insofar as machining or fabrication are concerned. In this connection, it should be noted that there are no extremely critical dimensional factors involved in the construction of the shield structure and that ordinary dimensional tolerances are permissible. Several sweep generators of this type have been constructed and have been found to be satisfactorily operable over the entire UHF television band.

While a particular embodiment of the present invention has been shown and described, it is apparent that changes and modifications may be made without departing from the invention in its broader aspects. The aim of the appended claims, therefore, is to cover all such changes and modifications as fall within the true spirit and scope of the invention.

I claim:

1. A sweep generator comprising: an electrically conductive shield structure defining a substantially totally enclosed field space; an oscillator, mounted within said shield structure, for establishing a radio-frequency electromagnetic field within said space; said oscillator including two reactance elements of opposite sign, at least one of which is variable for determining the maximum frequency range of said oscillator; means coupled to one of said reactance elements for cyclically varying the operating frequency of said oscillator at a preselected sweep frequency over said maximum range of frequencies; a transmission-line section having input terminals and output terminals and a predetermined characteristic impedance; a first resistive element, having an impedance substantially equal to said characteristic impedance, connected between said input terminals and extending into said space at a predetermined location; a second resistive element, having an impedance substantially equal to said characteristic impedance, connected between said output terminals; an amplitude-control circuit coupled to said transmission-line section and to said oscillator for maintaining the output of said oscillator at a substantially constant amplitude throughout said maximum range; and an output probe comprising a second transmission-line section having input terminals and output terminals and having a characteristic impedance substantially equal to that of said first transmission-line section, a third resistive element having an impedance substantially equal to said characteristic impedance connected between the input terminals of said second transmission-line section and extending into said space at a location displaced from said predetermined location, and means coupled to said output terminals for coupling said oscillator to an external load.

2. A sweep generator comprising: an electrically conductive shield structure defining a substantially totally enclosed field space; an oscillator, mounted within said shield structure, for establishing a radio-frequency electromagnetic field within said space; said oscillator including two reactance elements of opposite sign, at least one of which is variable for determining the maximum frequency range of said oscillator; means coupled to one of said reactance elements for cyclically varying the operating frequency of said oscillator at a preselected sweep frequency over said maximum range of frequencies; a balanced transmission-line section having input terminals and output terminals and a predetermined characteristic impedance; a first resistive element, having an impedance substantially equal to said characteristic impedance, connected between said input terminals and extending into said space at a predetermined location; means connecting the electrical center of said first resistive element to said shield structure; a second resistive element, having an impedance substantially equal to said characteristic impedance, connected between said output terminals; an amplitude-control circuit coupled to said transmission-line section and to said oscillator for maintaining the output of said oscillator at a substantially constant amplitude throughout said maximum range; and an output probe comprising a second transmission-line section having input terminals and output terminals and having a characteristic impedance substantially equal to that of said first transmission-line section, a third resistive element having an impedance substantially equal to said characteristic impedance connected between the input terminals of said second transmission-line section and extending into said space at a location displaced from said predetermined location, and means coupled to said output terminals for coupling said oscillator to an external load.

3. A sweep generator comprising: an electrically conductive shield structure defining a substantially totally enclosed field space; an oscillator, mounted within said shield structure, for establishing a radio-frequency electromagnetic field within said space; said oscillator including two reactance elements of opposite sign, at least one of which is variable for determining the maximum frequency range of said oscillator; means coupled to one of said reactance elements for cyclically varying the operating frequency of said oscillator at a preselected sweep frequency over said maximum range of frequencies; a transmission-line section having input terminals and output terminals and a predetermined characteristic impedance; a first resistive element, having an impedance substantially equal to said characteristic impedance, connected between said input terminals and extending into said space at a predetermined location; a second resistive element, having an impedance substantially equal to said characteristic impedance, connected between said output terminals; a detector connected across said transmission-line section to derive an amplitude-control signal representative of variations in the intensity of said field; an amplitude-control circuit coupled to said detector and to said oscillator for utilizing said amplitude-control signal to maintain the output of said oscillator at a substantially constant amplitude throughout said maximum range; and an output probe comprising a second transmission-line section having input terminals and output terminals and having a characteristic impedance substantially equal to that of said first transmission-line section, a third resistive element having an impedance substantially equal to said characteristic impedance connected between the input terminals of said second transmission-line section and extending into said space at a location displaced from said predetermined location, and means coupled to said output terminals for coupling said oscillator to an external load.

4. A sweep generator comprising: an electrically conductive shield structure defining a substantially totally enclosed field space; an oscillator, mounted within said shield structure, for establishing a radio-frequency electromagnetic field within said space; said oscillator including two reactance elements of opposite sign, one of which is variable for determining the maximum frequency range of said oscillator; means coupled to said variable reactance element for cyclically varying the operating frequency of said oscillator at a preselected sweep frequency over said maximum range of frequencies; a transmission-line section having input terminals and output terminals and a predetermined characteristic impedance; a first resistive element, having an impedance substantially equal to said characteristic impedance, connected between said input terminals and extending into said space at a predetermined location; a second resistive element, having an impedance substantially equal to said characteristic impedance, connected between said output terminals; an amplitude-control circuit coupled to said transmission-line section and to said oscillator for maintaining the output of said oscillator at a substantially constant amplitude throughout said maximum range; and an output probe comprising a second transmission-line section having input terminals and output terminals and having a characteristic impedance substantially equal to that of said first transmission-line section, a third resistive element having an impedance substantially equal to said characteristic impedance connected between the input terminals of said second transmission-line section and extending into said space at a location displaced from said predetermined location, and means coupled to said output terminals for coupling said oscillator to an external load.

5. A sweep generator comprising: an electrically conductive shield structure defining a substantially totally enclosed field space; an oscillator, mounted within said shield structure, for establishing a radio-frequency electromagnetic field within said space; said oscillator including two reactance elements of opposite sign, one of which is variable for determining the maximum frequency range of said oscillator and centrally disposed within said space; means coupled to said variable reactance element for cyclically varying the operating frequency of said oscillator at a preselected sweep frequency over said maximum range of frequencies; a transmission-line section having input terminals and output terminals and a predetermined characteristic impedance; a first resistive element, having an impedance substantially equal to said characteristic impedance, connected between said input terminals and extending into said space at a predetermined location radially displaced from said variable reactance element by a predetermined distance; a second resistive element, having an impedance substantially equal to said characteristic impedance, connected between said output terminals; an amplitude-control circuit coupled to said transmission-line section and to said oscillator for maintaining the output of said oscillator at a substantially constant amplitude throughout said maximum range; and an output probe comprising a second transmission-line section having input terminals and output terminals and having a characteristic impedance substantially equal to that of said first transmission-line section, a third resistive element having an impedance substantially equal to said characteristic impedance connected between the input terminals of said second transmission-line section and extending into said space at a location radially displaced from said variable reactance element by said predetermined distance, and means coupled to said output terminals for coupling said oscillator to an external load.

References Cited in the file of this patent

UNITED STATES PATENTS

| | | |
|---|---|---|
| 2,294,171 | George | Aug. 25, 1942 |
| 2,404,568 | Dow | July 23, 1946 |
| 2,564,005 | Halpern et al. | Aug. 14, 1951 |
| 2,564,059 | Gensel | Aug. 14, 1951 |
| 2,611,092 | Smullin | Sept. 16, 1952 |